United States Patent Office 2,837,548
Patented June 3, 1958

2,837,548

SEPARATION PROCESS USING COMPLEXING AND ADSORPTION

Frank Harold Spedding, Ames, Iowa, and John A. Ayres, Schenectady, N. Y., assignors to the United States of America as represented by the United States Atomic Energy Commission No Drawing. Application May 27, 1948
Serial No. 29,656

12 Claims. (Cl. 260—429.1)

This invention relates to an adsorption process, and more particularly to an adsorption process for separating plutonium from the elements present in neutron-irradiated uranium. The invention includes water-soluble complex compounds of plutonium particularly adapted for use in this process.

It is an object of this invention to provide a simple and efficient means to separate plutonium from one or more substances by an adsorption process.

Another object is to provide a method for modifying the adsorption characteristics of plutonium present in solution.

A more specific object of this invention is to provide an efficient means for separating plutonium from elements contained in a solution of neutron-irradiated uranium by modifying the adsorption characteristics of at least one of the substances present in solution.

Other objects of this invention will be apparent from the following description.

In accordance with the present invention, it has been found that an effective recovery of plutonium from a solution containing plutonium and other substances, such as uranium and fission products, may be secured by the formation of a chelate complex compound of plutonium, wherein the chelate complex containing the plutonium possesses a negative charge in solution, without likewise complexing the other substances in the solution. The solution containing the complex form of the plutonium is then contacted with an adsorbent whereby there is a slective adsorption of the ions of the other substances present in solution which have not been complexed, leaving the complex plutonium compound in solution.

A more specific embodiment of the invention relates to a method for recovering plutonium from a solution of neutron-irradiated uranium containing cations of plutonium and cations of uranium and fission products by contacting the solution with an adsorbent to selectively adsorb the plutonium from the solution, eluting the plutonium from the adsorbent, then forming a complex compound between plutonium and an organic complexing reagent, for example, a substituted 8-hydroxyquinoline compound, so as to form a water-soluble inner chelate complex compound of plutonium wherein the chelate complex containing the plutonium is in solution as an anion, contacting the resulting solution with an adsorbent to selectively adsorb at least one of the remaining cations present in solution, while the complexed plutonium compound is carried by the effluent solution. Subsequently the effluent solution is modified so as to release the plutonium from the complex compound to form a cation of plutonium. The resulting solution is then contacted with an adsorbent to selectively adsorb the plutonium from the solution leaving ions of other compounds remaining in the effluent solution.

The separation process is particularly effective when applied to a complexing reagent with the plutonium in solution wherein the plutonium is in a reduced valence state. The reduced valence state of plutonium which forms the complexes with complexing reagents includes the plutonium in a valence state not greater than $+4$, and primarily in valence states of $+3$ and $+4$.

The complex compounds of plutonium in the present invention are compounds of the chelate type, as has been mentioned before. For example, the plutonium complex formed between tetravalent plutonium and an organic complexing reagent, such as ferron, which is a sulphonic-acid derivative of 8-hydroxyquinoline (7-iodo-8-hydroxyquinoline-5-sulphonic acid), appears to be a five-membered ring chelate-type complex. The reactive group of the chelate complex compound generally contains a nitrogen linkage.

Complexing compounds of the oxine type form co-ordination chelate complexes with a metal ion by replacing the hydrogen of the phenolic group, for instance that of 7-iodo-8-hydroxyquinoline-5-sulphonic acid. This ferron complexing reagent appears to be specific for trivalent and tetravalent ions. When $Fe^{+++}$, $Pu^{IV}$, $Zr^{IV}$ and several other ions are present in solution, ferron forms chelate complexes which are soluble over certain pH ranges. The Pu(IV) complex is very stable from a $pH=4$ to $pH=8$, while the rare earth complexes are rather unstable below the pH of 7. These considerations afford a means for separating plutonium from the rare earths, $Ba^{++}$, $Sr^{++}$, and many other ions.

Plutonium will also form co-ordinated organic chelate complex compounds with other substituted 8-hydroxyquinoline compounds, as for example 8-hydroxyquinoline-5-azo-(p-benzene-sulphonic acid). When reacting the azo-substituted derivative of 8-hydroxyquinoline with tracer amounts of plutonium contained in an aqueous solution, it was found that the complexed compound of 8-hydroxyquinoline-5-azo-(p-benzene sulphonic acid) with plutonium was soluble in aqueous solution. When compounds containing $Fe^{+++}$, $UO_2^{++}$, and $Th^{IV}$ ions were contained in the solution having a pH between 5 and 6, insoluble precipitates of $Fe^{+++}$, $UO_2^{++}$, and $Th^{IV}$ would be formed with the substituted 8-hydroxyquinoline compound.

In comparing the complexing action of 8-hydroxyquinoline-5-azo-(p-benzene-sulphonic acid) with plutonium and the complexing action of ferron with plutonium in aqueous solution, it was found that the azo-substituted derivative of 8-hydroxyquinoline exhibited similar complexing action with plutonium as did ferron with plutonium.

In general, the chelate complex compounds formed between plutonium and chelate complexing reagents, such as substituted 8-hydroxyquinoline compounds, may be identified as inner complex salts, wherein the chelate complex containing plutonium possesses a residual negative charge. For example, it is believed that a characteristic chelate complex between plutonium and 8-hydroxyquinoline-5-azo-(p-benzene-sulphonic acid) may be represented by the following formula,

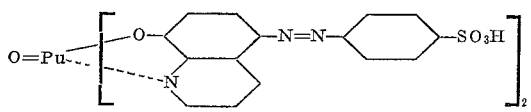

Other organic compounds exhibited preferred complexing reactions with plutonium in aqueous solution, as for example, 8-hydroxyquinoline-5-sulphonic acid, furohydroxamic acid and p-hydroxy-acetophenone. Accordingly, these compounds may be substituted for ferron in the separation process.

The adsorbents used in this separation process are the cation exchange adsorbents, such as the inorganic zeolites, the sulphonated coals, and the preferred synthetic phenol formaldehyde cation exchange resins. Generally, these synthetic resin cation exchangers are condensation products of the polyhydric phenol formaldehydes with sulphonic acid groups incorporated to increase the adsorption capacity in the low pH regions.

In one embodiment of the separation process of this invention the neutron-irradiated uranium mass is dissolved in an excess of nitric acid and the nitric acid remaining is destroyed by the addition of formic acid. Then the acidity of the treated solution is adjusted to a pH of about 2.5 by the addition of a solution of sodium hydroxide. The quantity of formic acid employed may be controlled so as to destroy more or less of the excess nitric acid. The quantity of sodium hydroxide used, therefore, will depend upon the nitric acid still remaining after the use of the formic acid. Consequently, the quantity of sodium nitrate and other nitrates that are present in the solution after adjusting the pH will depend upon how much of the nitric acid is left when the sodium hydroxide is added. A high salt content (total nitrates) in the metal solution is disadvantageous since it results in the washing out of a fairly large proportion of the plutonium when the uranyl nitrate is washed out of the adsorption column. Table 1 illustrates the use of formic acid in neutralizing the excess nitric acid, the amounts of sodium hydroxide required to adjust the pH, and the disadvantage resulting from large quantities of nitrates.

*Table 1*

| Neutron irradiated uranium sample No. | Amount of conc. $HNO_3$ added, liters | Amount of formic acid added, cc. | NaOH required to bring pH to 2.5, g. | Mg Pu in original | Mg Pu in effluent |
| --- | --- | --- | --- | --- | --- |
| 1 | 7.5 | None | 750 | 4.92 | 1.2 |
| 2 | 9.0 | None | 1,100 | 5.20 | 3.14 |
| 3 | 7.5 | 900 | 200 | 5.40 | 0.39 |
| 4 | 7.5 | 675 | 105 | 5.00 | 0.293 |
| 5 | 7.5 | 475 | 60 | 4.30 | 0.24 |

The solutions from each sample were kept separate and treated as shown in the above table. The solutions were then diluted to about 26 liters each after the adjustment of the acidity to a pH of about 2.5.

A series of three adsorption columns were prepared and filled with a cation exchange adsorption resin, the columns being 120 centimeters high. Column I was 5.2 centimeters in diameter, and columns II and III had cross sections of 7 square centimeters. Column I contained a phenol formaldehyde resin containing $SO_3H$ groups. Solutions were passed through this column at the flow rate of about 150 cc./min. Column II was filled with phenol formaldehyde resin having $SO_3Na$ groups, and the flow rate used was about 7 cc./(cm.)$^2$/(min.). Column III was filled with the same resin as column I, and the flow rate used was about 7 cc./(cm.)$^2$/(min.). The flow rates in columns II and III were about 50 cubic centimeters per minute, or about one-third of that used in column I.

The solution from one sample was passed through column I. It was found that the first 20 percent of the solution had been freed of plutonium and contained little or no uranium or fission products. Consequently this part was discarded and the remainder of the effluent was retained for further treatment. After the solution had passed through column I, the column was washed with about 15.6 liters of 2.5 percent $H_2SO_4$ using a flow rate of 150 cc./min.

The next step was to elute the products from the resin of column I by passing about 6.5 liters of 18 percent $NaHSO_4$ solution through the column at the usual flow rate. The eluate was next treated as shown in the following paragraph.

On account of the large amount of salts which were in the solutions, the eluate from column I was treated with 3 to 4 grams each of $UO_2^{++}$, $Ce^{+++}$, $Y^{+++}$, $La^{+++}$, and $Sr^{++}$ carriers and the resulting solution was made alkaline to a pH of >14 by means of a solution of sodium hydroxide and then diluted to a volume of 25 liters. The precipitate was allowed to settle and the supernatant solution was removed. The residue was then slurried with 20 liters of water and the precipitate was again allowed to settle. The supernatant solution was again pumped off and combined with the first supernatant solution. Analysis of the combined solutions showed that they contained over 99 percent of the $NaHSO_4$ and less than 0.1 percent of the plutonium originally present. The uranyl ion was added to give a heavy bulky precipitate which settles rapidly and thus reduces the chances of mechanical loss during the decantation and washing.

The residue from the treatment described in the preceding paragraph was next dissolved in 20 to 30 cc. of 10 N $H_2SO_4$ solution. The solution was diluted somewhat with water and a solution of 25 grams of the sodium salt of ferron in water was added while stirring. The acidity of the solution was then adjusted to a pH of 5.5 by means of sodium hydroxide. The solution was finally diluted with water to a volume of about 24 liters.

The ferron-treated solution was then passed through column II at the flow rate stated above. After the solution had passed through the column, the column was washed with a sufficient quantity of dilute solution of ferron to displace the feed solution in the column. Analysis of the combined effluent and wash from this treatment showed that greater than 99 percent of the plutonium was found in the combined effluent and wash solution from column II.

The effluent and wash solution from column II was adjusted with sulfuric acid solution to a pH of approximately 2.5. At this acidity the plutonium-ferron complex was broken and the plutonium ions were again capable of adsorption on a cation resin exchanger.

The solution was next passed through column III at the flow rate of 7 cc./(cm.)$^2$/(min.). The column was then washed with a dilute sulfuric acid solution of a pH of about 2.5. The plutonium and some fission products were retained on the resin.

Column III was then treated with various solutions for specific elution of activities. Column III, when used with solutions from samples 1, 2 and 3, was then eluted with an 18 percent aqueous solution of $NaHSO_4$. After the solution from sample 4 was passed through column III, the wash solutions used were, first, 0.75 percent aqueous solution of oxalic acid, and second, concentrated oxalic acid solution. For sample 5 the treatment of column III was a 0.4 percent oxalic acid wash and an 8 percent oxalic acid solution for elution.

The results of the runs for the solutions of the five samples are given in Table 2.

Table 2

| | Original NaOH used | Sample 1 | Sample 2 | Sample 3 | Sample 4 | Sample 5 |
|---|---|---|---|---|---|---|
| | | 4.92 mg. (~750 g.) | 5.2 mg. (1,100 g.) | 5.4 mg. (200 g.) | 5.0 mg. (110 g.) | 4.30 mg. (57 g.) |
| | | $Mg.$ | $Mg.$ | $Mg.$ | $Mg.$ | $Mg.$ |
| Column I | Effluent | 1.20 | 3.14 | 0.391 | 0.29 | 0.240 |
| | Wash | | 0.028 | 0.015 | | 0.092 |
| | Pre-eluate | 0.005 | 0.073 | 0.059 | 0.0046 | |
| | Eluate | 3.68 | 1.74 | 5.3 | 4.70 | |
| | Post-eluate | 0.034 | 0.074 | | 0.030 | |
| Hydroxide precipitation | Supernatant | 0.028 | | 0.029 | 0.003 | |
| Column II (A) | Effluent | 3.57 | 1.76 | 5.32 | 4.97 | 3.95 |
| | Wash | .002 | | .0022 | 0.026 | 0.0027 |
| | Eluate | | | | | |
| Column II (B) | Effluent | 2.59 | | 5.0 | 0.0041 | [1] 0.25 |
| | Wash | 0.06 | | | 0.320 | |
| | Eluate | 0.474 | | 0.069 | | |
| Column III | Effluent | 0.02 | 0.034 | 0.020 | 0.003 | .038 |
| | Wash (sulfuric) | 0.075 | 0.019 | 0.002 | 0.0013 | |
| | Wash (oxalic) | | | | 1.36 | |
| | Eluate ($H_2C_2O_4$) | | | | 3.11 | 3.47 |
| | Eluate ($NaHSO_4$) | 2.46 | 1.52 | 4.6 | | |
| | Post-eluates | 0.12 | 0.73 | 0.03 | | 0.28 |

[1] Removed for spec. experiment.

Samples were taken from the various solutions, washes and effluents and the amounts of plutonium, total beta and gamma activity, and specific fission product activity and $UX_1$ were determined by standard radiochemical techniques.

In these tables the symbol d./m. stands for disintegrations per minute. The decontamination factor is the ratio of the amount of a contaminating element present before treatment to the amount present after treatment.

Table 3 shows the over-all decontamination for solutions 1, 3, 4 and 5, after passing through column II. It will be noted that in certain experiments two columns designated as II$a$ and II$b$ were used in place of one column II. In these instances the effluent from column II$a$ was passed through an additional column filled with phenol formaldehyde resin having $SO_3Na$ groups, designated as column II$b$, in an attempt to remove further amounts of activities which may have passed through column II$a$.

Table 3

| Sample No. | $\beta$ and $\gamma$ activity in d./m. in original | $\beta$ and $\gamma$ activity in d./m. in effluent column II$a$ | Decontamination factor through column II$a$ | $\beta$ and $\gamma$ activity in d./m. in effluent column II$b$ | Decontamination factor through column II$b$ |
|---|---|---|---|---|---|
| 1 | 6.8 ×10⁷ | 3.77×10⁵ | 181 | | |
| 3 | 6.0 ×10⁷ | 5.3 ×10⁵ | 113 | 2.76×10⁵ | 217 |
| 4 | 5.0 ×10⁷ | | | 2.63×10⁵ | 137 |
| 5 | 3.32×10⁷ | 1.47×10⁵ | 226 | No column II$b$ | |

Decontamination results for specific elements in sample 5 after column II are shown in Table 4.

Table 4

| Fission product | $\beta$ and $\gamma$ activity in d./m. in original | $\beta$ and $\gamma$ activity in d./m. in effluent column II$a$ | Decontamination factor |
|---|---|---|---|
| (Zr–Cb) | 6.4 ×10⁶ | 1.21×10⁵ | 53 |
| Ce | 2.16×10⁷ | 7.96×10³ | 2.74×10³ |
| Y | 5.2 ×10⁵ | 129 ×10³ | 4.03×10³ |
| $UX_1$ | 3.6 ×10⁴ | 1.65×10⁴ | 2.2 |

The over-all decontamination for the solutions from samples 1 and 3 after elution from column III by 18 percent aqueous solution of $NaHSO_4$ is shown in Table 5. In this table the effluent $NaHSO_4$ solution is referred to as "product eluate."

Table 5

| Sample No. | Total activity in original, d./m. | Total activity in product eluate | Decontamination factor for 100 percent Pu recovery | Decontamination factor correcting for $UX_1$ |
|---|---|---|---|---|
| 1 | 6.8×10⁷ | 15,258 | 2.17×10³ | 2.18×10³ |
| 3 | 6.0×10⁷ | 15,155 | 3.36×10³ | 4.95×10³ |

Specific decontamination factors for Ce, Y, $UX_1$ and Zr–Cb activities of the $NaHSO_4$ effluent from column III for samples 1 and 3 are shown in Table 6.

Table 6

| Fission product | Activity in d./m. in original for Sample 1 and Sample 3 | Activity in d./m. for product eluate for Sample 1 | Activity in d./m. for product sol'n for Sample 3 | Decontamination factor for Sample 1 | Decontamination factor for Sample 3 |
|---|---|---|---|---|---|
| Zr–Cb | ~1.5 ×10⁷ | 4,210 | 5,000 | 2.73×10³ | 2.3 ×10³ |
| Ce | ~3.91×10⁷ | 10,000 | 4,400 | 3.91×10³ | 8.9 ×10³ |
| Y | ~.94×10⁷ | 952 | 880 | 9.9 ×10³ | 1.07×10⁴ |
| $UX_1$ | 3.6 ×10⁴ | 96 | 4,875 | 3.75×10² | 7.4 |

Results from the oxalic washes and eluates from column III for sample 4 are given in Table 7.

Table 7

| Fraction | Volume of fraction, liters | mg. of Pu | Total activity in fraction |
|---|---|---|---|
| A. 0.75 percent oxalic wash I | 3.0 | .13 | 36,800 d./m.[1] |
| B. 0.75 percent oxalic wash II | 9.5 | .73 | 400 d./m. |
| C. 0.75 percent oxalic wash III | 2.25 | .50 | Negligible. |
| D. Conc. oxalic eluate I | 1.5 | 2.301 | 173 d./m. |
| E. Conc. oxalic eluate II | 1.5 | .26 | Negligible. |

[1] Analysis of the $\beta$ ray absorption curve on this sample indicated 90 percent of the activity was due to Zr.

Results from 8 percent oxalic elution which followed the 0.4 percent oxalic wash on column III for sample 5 are given in Table 8.

*Table 8*

| Fission product | Activity in original, d./m. | Activity in product solution, d./m. | Decontamination factor |
|---|---|---|---|
| Zr and Cb | $6.4 \times 10^6$ | 807 | $7.9 \times 10^3$ |
| Ce | $2.16 \times 10^7$ | 15 | $1.43 \times 10^6$ |
| Y | $5.2 \times 10^6$ | 1 | $5.2 \times 10^6$ |
| UX$_1$ | $3.6 \times 10^4$ | 2,880 | 12.5 |
| Total | $3.32 \times 10^7$ | 3,703 | $9.0 \times 10^3$ |
| $4.03 \times 10^{1*}$ | | | |

*The over-all recovery of plutonium in this cycle was ~92 percent with a decontamination factor of $4.3 \times 10^4$. This (*) value in Table 8 is the decontamination value corrected for UX$_1$ activity.

In preparing the eluate solutions from column III for analysis for plutonium, the oxalic acid present was sublimed with $H_2SO_4$ and $H_2SO_4$ was then evaporated to dryness. The residue was dissolved in nitric acid and made up to a desired volume and aliquots were taken for analysis by the customary radiochemical techniques. These results are extremely accurate, while those from intermediate treatments from column I and column II are less accurate since volume estimations are accurate in these cases to only 5–10 percent. Table 2 gives the analytical results for plutonium.

The final product solutions obtained as shown in the paragraph immediately preceding were extracted with an ethylene-diimine derivative—di(2,3-dihydroxy-5-tertiary-butylbenzal) ethylenediimine and analyzed by the conventional chemical procedure.

On the basis of this process a procedure using three successive steps of adsorption utilizing a cation exchange phenol formaldehyde resin as the adsorbent gives a complete separation from uranium, a decontamination factor of about $10^4$ to $10^5$ (exclusive of UX$_1$), and a final volume of about one liter per kilogram of irradiated uranium metal. On a large scale production, the final volume would be approximately 50 to 100 cc. per kg. of uranium.

Plutonium is in its most stable state, Pu(IV), throughout the entire cycle. The addition of a reducing agent to the first column eluate produced no appreciable changes in the final results.

A saturated oxalic acid solution is preferred over 18% NaHSO$_4$ for the elution of plutonium from column III mainly from the standpoint of decontamination studies. The decontamination factor for saturated oxalic acid elution is greater by a factor of 10 than that for an 18% NaHSO$_4$ elution.

The oxalic acid eluate contains practically no contaminant other than zirconium. Coupling this adsorption process with another step which would remove zirconium from plutonium would give any desired decontamination. Such a process would be the zirconium phenylarsonate separation from Pu$^{+3}$ fluoride precipitate, or recycling through a cation exchange phenol formaldehyde resin column.

Although the present invention has been described with particular reference to the specific details of certain embodiments thereof, it is not intended that such details shall be regarded as limitations upon the scope of the invention except insofar as included in the accompanying claims.

What is claimed is:

1. A process for recovering plutonium from a solution of neutron irradiated uranium containing ions of a compound of plutonium and other cations which comprises forming a chelate complex compound with plutonium ions in solution by adding a derivative of 8-hydroxyquinoline, said derivative containing a sulphonic acid group, and adsorbing at least one of the remaining cations from the solution.

2. A method of separating plutonium from a solution of neutron irradiated uranium containing ions of a compound of plutonium in which the plutonium is in a valence state not greater than +4 and fission products which comprises forming a chelate complex compound containing plutonium by adding a derivative of 8-hydroxyquinoline, said derivative containing a sulphonic acid group, contacting said solution with a cation adsorbent to selectively adsorb at least one of the other cations thereby allowing the complex compound of plutonium to remain in solution.

3. A method of separating plutonium from a solution of neutron irradiated uranium containing ions of a compound of plutonium having a valence state not greater than +4 and fission products, which comprises forming a nitrogen-containing chelate complex compound between plutonium and a derivative of 8-hydroxyquinoline, said derivative containing a sulphonic acid group, contacting said solution with a cation exchange resin whereby at least one of the fission products is adsorbed by the adsorbent and the chelate complexed plutonium compound remains in the effluent solution.

4. A method of separating plutonium from a solution of neutron irradiated uranium containing ions of a compound of plutonium having a valence state not greater than +4 and fission products, which comprises forming a five-membered chelate complex compound between plutonium and a derivative of 8-hydroxyquinoline, said derivative containing a sulphonic acid group, contacting said solution with a cation exchange resin whereby at least one of the fission products is adsorbed by the adsorbent and the chelate complexed plutonium compound remains in the effluent solution.

5. A method of separating plutonium from an aqueous solution of neutron irradiated uranium containing ions of a compound of plutonium having a valence state not greater than +4 and ions of compounds of uranium and fission products, which comprises contacting said solution with 7-iodo-8-hydroxyquinoline-5-sulphonic acid so as to form a chelate complex compound with plutonium in solution; contacting said solution with a cation exchange resin to selectively adsorb at least one of the fission products from solution, thereby leaving the chelate complexed plutonium compound in the effluent solution.

6. A method of separating plutonium from an aqueous solution of neutron irradiated uranium containing ions of a compound of plutonium having a valence state not greater than +4 and ions of compounds of uranium and fission products, which comprises contacting said solution with 8-hydroxyquinoline-5-azo-(p-benzene sulphonic acid) so as to form a chelate complex compound with plutonium in solution; contacting said solution with a cation exchange resin to selectively adsorb at least one of the fission products from solution, thereby leaving the chelate complexed plutonium compound in the effluent solution.

7. The method of separating plutonium from a solution of neutron irradiated uranium containing ions of a compound of plutonium having a valence state not greater than +4 and ions of compounds of fission products which comprises contacting said solution with 7-iodo-8-hydroxyquinoline-5-sulphonic acid, said solution having a pH range between 4 and 8, forming a chelate complex compound between plutonium and 7-iodo-8-hydroxyquinoline-5-sulphonic acid, contacting said solution with a phenol formaldehyde condensation cation exchange resin to selectively adsorb ions of compounds of fission products from said solution leaving the chelate complexed compound between plutonium and 7-iodo-8-hydroxyquinoline-5-sulphonic acid in the effluent solution.

8. A method for recovering plutonium from a solution of neutron irradiated uranium containing ions of a compound of plutonium and ions of compounds of fission products and uranium which comprises contacting said solution in which the plutonium is in a valence state not greater than +4 with a cation exchange resin derivative of a condensation product of phenol formaldehyde, eluting the resulting adsorbate with sulfuric acid and successively with NaHSO₄ solution, rendering the resulting eluate alkaline and contacting said eluate with a basic plutonium carrier, separating and dissolving the resulting carrier precipitate, adding a sodium salt of 7-iodo-8-hydroxyquinoline-5-sulphonic acid to the solution thus produced, adjusting the acidity of the solution and contacting said solution with a basic resin derivative of a phenol formaldehyde condensation product, desorbing the solution from said resin, adjusting the pH of the resulting solution, then contacting said solution with a phenol formaldehyde cation exchange resin derivative, eluting the adsorbed plutonium from the resin adsorbate with an oxalic acid solution, thereafter decomposing the oxalic acid present in the eluate by heating with sulfuric acid and then recovering the plutonium therefrom.

9. A water soluble organic chelate complex of plutonium and an 8-hydroxyquinoline of the group consisting of 7-iodo-8-hydroxyquinoline-5-sulphonic acid and 8-hydroxyquinoline-5-azo-(p-benzene sulphonic acid).

10. An organic chelate complex of 7-iodo-8-hydroxyquinoline-5-sulphonic acid and plutonium.

11. A water soluble organic chelate complex of 7-iodo-8-hydroxyquinoline-5-sulphonic acid and tetravalent plutonium.

12. A water soluble organic chelate complex of 8-hydroxyquinoline-5-azo-(p-benzene sulphonic acid) and plutonium.

References Cited in the file of this patent

Synthetic Organic Chemicals, vol. VII, No. 5, pp. 1, 2, July 1934, publ. by Eastman Kodak, Rochester, N. Y.

Harvey et al.: Jour. of the Chem. Soc., August 1947, pp. 1010–1021.